United States Patent [19]

Dames

[11] Patent Number: 5,024,104
[45] Date of Patent: Jun. 18, 1991

[54] COMBINED OUTPUT AND DRIVE CIRCUIT FOR A MASS FLOW TRANSDUCER

[75] Inventor: Andrew N. Dames, London, England

[73] Assignee: Schlumberger Industries Limited, Farnborough, England

[21] Appl. No.: 454,250

[22] Filed: Dec. 21, 1989

[30] Foreign Application Priority Data

Dec. 21, 1988 [GB] United Kingdom ............... 8829825

[51] Int. Cl.$^5$ .............................................. G01F 1/84
[52] U.S. Cl. .............................................. 73/861.37
[58] Field of Search ......................... 73/861.37, 861.38

[56] References Cited

U.S. PATENT DOCUMENTS

| | | | |
|---|---|---|---|
| 4,747,312 | 5/1988 | Herzl | 73/861.38 |
| 4,801,897 | 1/1989 | Flecken | 73/861.38 X |
| 4,852,409 | 8/1989 | Herzl | 73/861.38 |
| 4,911,020 | 5/1990 | Thompson | 73/861.38 |

FOREIGN PATENT DOCUMENTS 2577667 8/1986 France .

OTHER PUBLICATIONS

The article "Coriolis Mass Flow Measurement" by ALan Young, pp. 195-197, Measurements and Control, Sep. 1988.

Primary Examiner—Herbert Goldstein
Attorney, Agent, or Firm—Sanford J. Asman

[57] ABSTRACT

Amplitude-balanced input signals ($I_1$ and $I_2$) from two pick-up coils spaced along a vibrating tube mass flow transducer are used to form sum and difference signals (S and D). These are multiplied by quadrature and in-phase signals (Q and I) respectively in multipliers, the multiplying signals being generated by a phase-locked loop locked to the sum signal (S). The in-phase signal (I) provides the drive signal for a drive coil (12) of the transducer. The product signals ($P_S$ and $P_D$) from the two multiplier are smoothed in low pass filters to provide sum and difference voltages ($V_S$ and $V_D$). Mass flow rate is proportional to the phase difference (represented by the ratio of these voltages) divided by the frequency of the I signal. The density of the fluid in the transducer is indicated by the frequency of the I signal.

16 Claims, 8 Drawing Sheets

COMBINED OUTPUT AND DRIVE CIRCUIT FOR A MASS FLOW TRANSDUCER

BACKGROUND OF THE INVENTION (1) Field of the Invention

The present invention relates to a combined output and drive circuit for a mass flow transducer such as a Coriolis type mass flow transducer.

(2) Description of the Prior Art

Example of Coriolis type transducers are described in GB-A Nos. 2 202 631, 2 192 714 and 2 212 613. The details of such transducers form no part of the present invention. It is sufficient to know that a vibrating tube is driven at its resonant frequency by a drive signal applied to a drive coil or other transducer, e.g., piezoelectric, and has two spaced pick-up coils or other transducers, e.g., optical pick-ups. The mass flow rate in the tube is a linear function of the ratio of the phase difference between the two signals provided by the pick-up coils to the resonant frequency.

The data provided by such transducers will commonly form the basis for charging for bulk supplies of fluids flowing in pipelines, and there is a need to ensure that measurements are extremely accurate. A relatively small error can translate into a large sum of money in the charge for bulk supplies.

SUMMARY OF THE INVENTION

The object of the present invention is to provide a relatively simple circuit which can meet the required objective as well as providing the drive signal for the transducer. The circuit according to the invention comprises a combined output and drive circuit for providing a drive signal for a drive transducer of a mass flow transducer in response to two input signals fed to the circuit from spaced pick-up transducers of the transducer. The circuit comprises means for forming a first signal from at least one of the two input signals and a difference signal from the input signals, a phase locked loop oscillator circuit controlled by the first signal and providing the drive signal and first and second multiplying signals in phase quadrature with each other, means for multiplying the first and difference signals by the first and second multiplying signals respectively to form two product signals, and low pass filter means for filtering the two product signals to provide two measurement voltages related to phase difference and hence to mass flow rate.

It is desirable that the amplitudes of the input signals be accurately balanced, e.g., to $+/-0.5\%$. If the transducer is itself incapable of achieving this, balance control means may be incorporated.

The invention lends itself to implementation in many ways. In the preferred embodiment described below, the multiplying signals are switching waveforms and each multiplying means is a switching type multiplier switching non-inverted and inverted versions of the signal fed to the multiplying means to be multiplied by the appertaining switching waveform.

In a first alternative, the multiplying signals are analog signals and each multiplying means is an analog multiplier. In a second alternative, the multiplying signals are digital values read out of memory means in cyclic sequence in response to addressing means controlled by the oscillator circuit and each multiplying means is a multiplying digital to analog converter.

BRIEF DESCRIPTION OF THE DRAWINGS

The invention will be described in more detail, by way of example, with reference to the accompanying drawings, in which.

DESCRIPTION OF THE PREFERRED EMBODIMENTS

Figure 1:
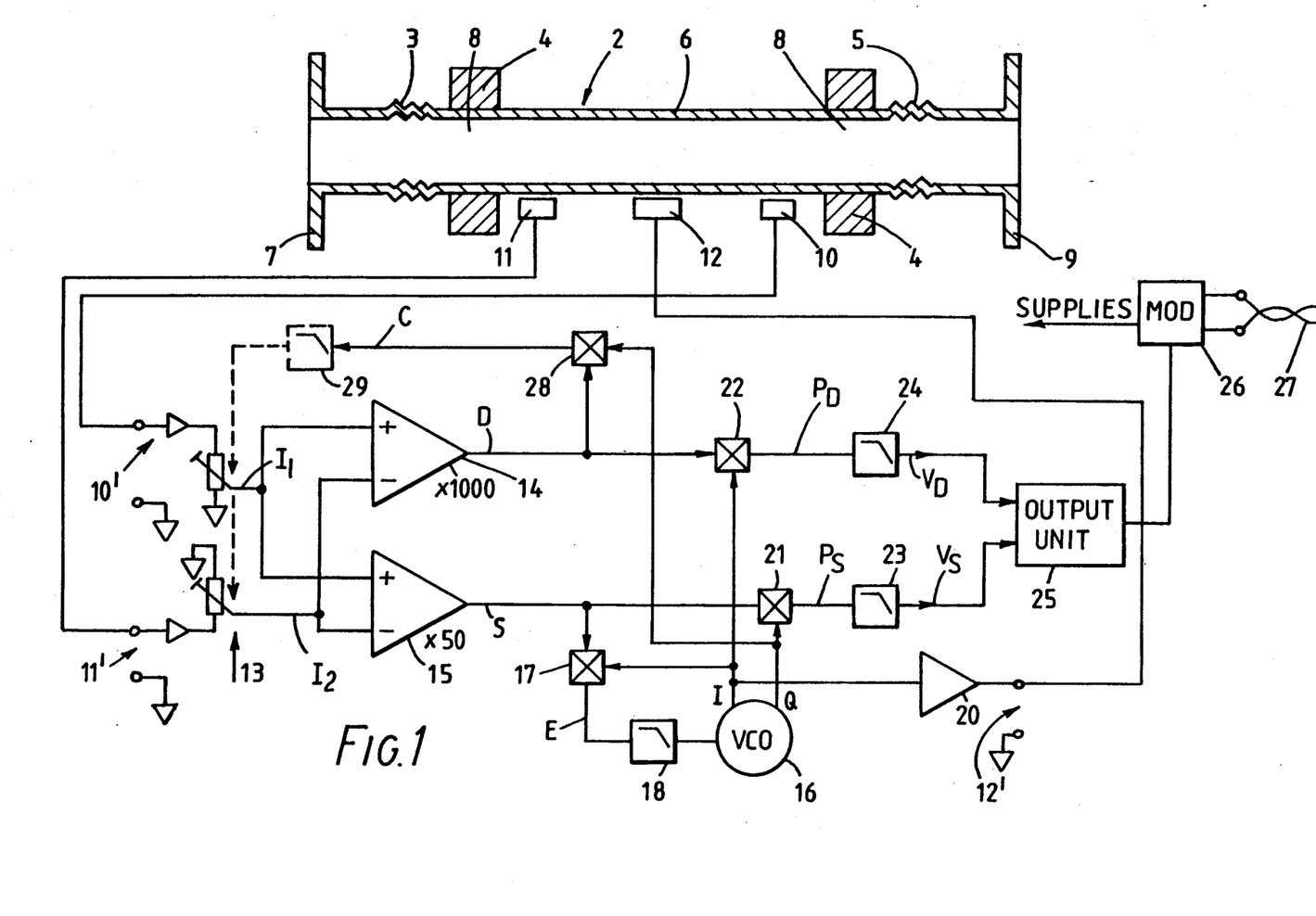
FIG. 1 is a block diagram of one embodiment of the invention.

FIG. 1 shows a circuit in accordance with the invention with inputs 10' and 11' connected to two pick-up transducers 10 and 11 and output 12' connected to a drive transducer 12 of a mass flow transducer 2 of the known kind referred to above. The mass flow transducer 2 comprises a tube 6 isolated from two flanges 7, 9 by bellows 3, 5, the flanges serving to connect the tube into a pipeline. The tube vibrates between two nodes 8 established by masses 4, being excited at resonant frequency by the drive transducer 12 located at the centre of the tube. The pick-up transducers 10, 11 sense the vibrations of the tube to either side of the drive transducer. The pick-up coils 10 and 11 provide two input signals which are applied to balance adjusting means 13 schematically shown as adjustable potentiometers. The balanced input signals are applied to a very high gain differential amplifier 14 providing a difference signal D and to a high gain sum amplifier 15 providing a sum signal S.

A voltage controlled oscillator 16 provides first and second multiplying signals Q and I in phase quadrature with each other and in the form of switching waveforms. The I signal multiplies the sum signal S in a switching type multiplier 17 to provide an error signal E. The error signal E, smoothed by a low pass filter 18 provides the control voltage for the voltage controlled oscillator 16 in a conventional phase-locked loop arrangement. The oscillator frequency is thus locked to the resonant frequency of the transducer and the I signal is also used to drive the transducer via an amplifier 19 and the drive coil 12.

The sum signal S is multiplied by the quadrature multiplying signal Q in another switching type multiplier 21 to form a first product signal $P_S$. The difference signal D is multiplied by the in-phase multiplying signal I in another switching type multiplier 22 to form a second product signal $P_D$. The two product signals $P_S$ and $P_D$ are applied to respective low-pass output filters 23 and 24 which provide sum and difference output voltages $V_S$ and $V_D$ respectively. These voltages are related to the phase difference between the vibrations at the two pick-ups 10, 11 and hence are related to mass flow rate. They provide base output data from which the mass flow rate and also the density of the fluid flowing through the transducer may be ascertained. An output unit 25 may be provided to process $V_S$ and $V_D$ by providing a square wave signal whose frequency is determined by the drive frequency (which is dependent on fluid density) and whose mark-space ratio varies linearly with the ratio of $V_D$ to $V_S$. The datum mark-space ratio, when $V_D=0$ may be unity (duty cycle 50%), the mark-space ratio at the output of the unit 25 being given by $1+V_D/V_S$.

The output square wave signal is injected in a modulator/power supply unit 26 which provides the operating voltages for the circuit and also puts a signal on the power cable 27 allowing the output square wave to be transmitted to a remote station without the need for separate signal lines.

Figure 2:
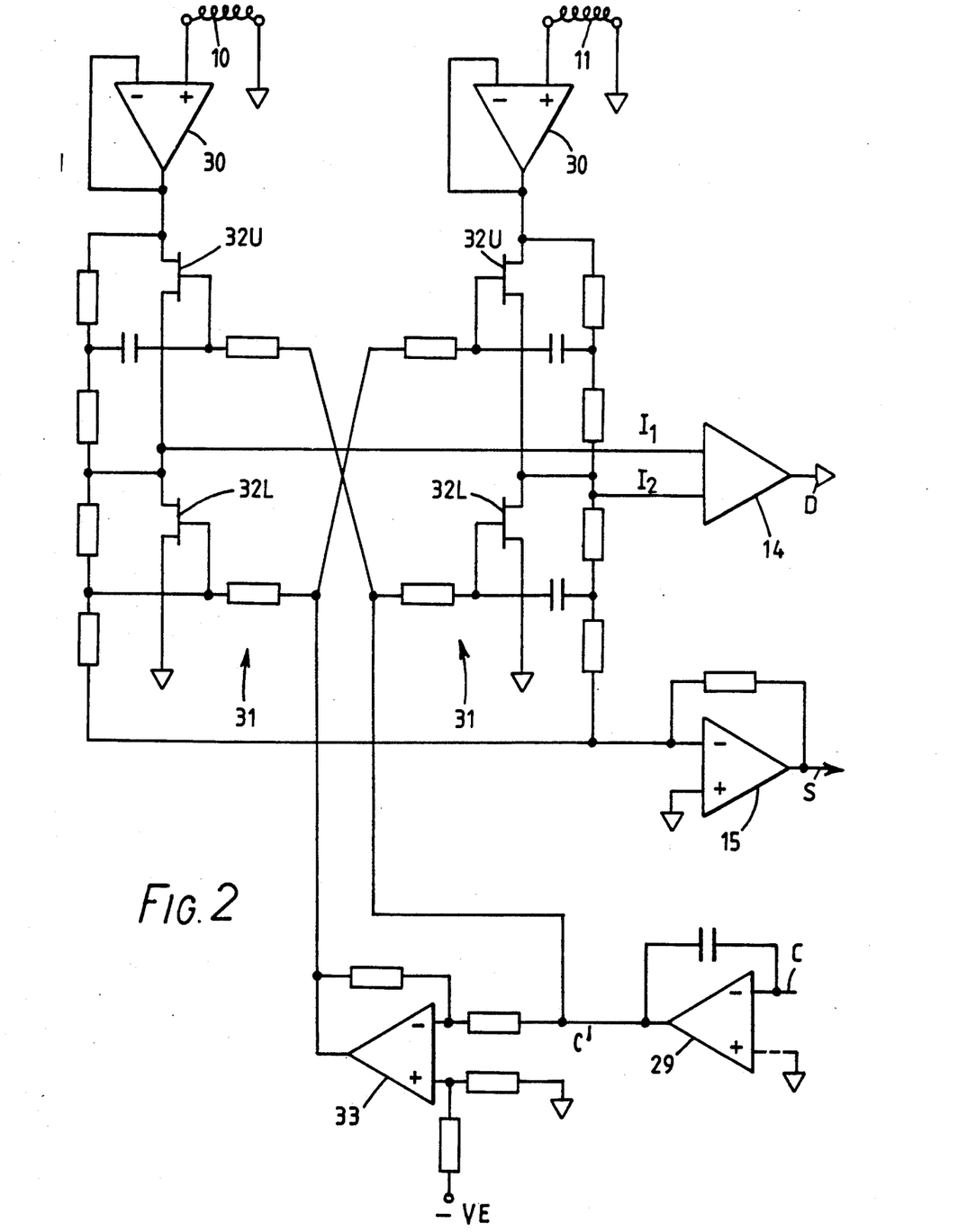
FIG. 2 shows a balancing circuit in more detail.

The difference signal D is multiplied by the signal Q in another switching type multiplier 28 to provide a balance control signal C which, after smoothing in a low pass filter or integrator 29, is used to control the balance adjusting means 13. A practical implementation of these means is shown in FIG. 2. The two input signals are applied by operational amplifiers 30 to two potentiometric chains 31 from which two balanced input signals I, and $I_2$ are picked off for application to the different amplifier 14. The potentiometer chains are connected together to the virtual earth at one input of an operational amplifier constituting the summing amplifier 15.

Each potentiometric chain 31 includes an upper and lower FET 32U, 32L. The balance control signal is smoothed to a signal C' by the low-pass filter 29, constituted by an operational amplifier with capacitive feedback. The control signal C' controls the upper FET 32U of the left potentiometric chain 31 in FIG. 2 and the lower FET 32L of the right chain. An inverted control signal C'' provided by an inverting amplifier 33 controls the other two FETs. It can readily be seen that variation of C' in one sense will both increase $I_1$, and decrease $I_2$ whereas variation in the other sense will both decrease $I_1$, and increase $I_2$, whereby the desired balance control is effected.

The particular design of the balance adjusting means 13 ensures that the differential phase shift which it introduces is extremely small (0.0003° for a 2:1 imbalance correction at 700 Hz). This is due in part to the fact that it output impedance is both low and substantially constant. The key to this is the two pairs of oppositely driven FETs 32U and L (right) and 32U and L (left).

Figure 3:
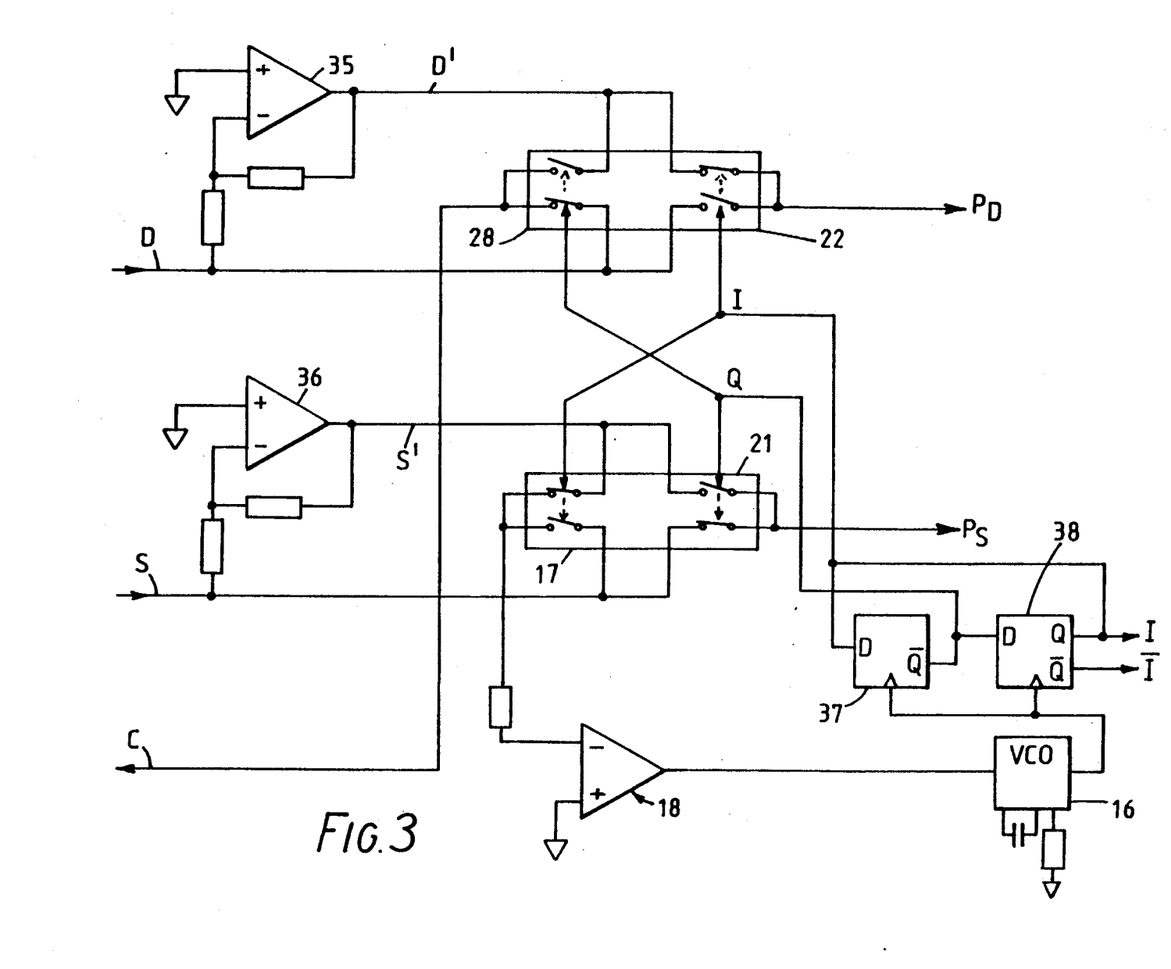
FIG. 3 shows details of an oscillator and multiplier circuit.

FIG. 3 shows details of the voltage controlled oscillator 16, filter 18 and multipliers 17, 21, 22, 28, in each of which the controlling signal I or Q as the case may be switches between the difference signal D and an inverted difference signal D' provided by an inverting amplifier 35 or switches between the sum signal S and an inverted sum signal S' provided by an inverting amplifier 36. The oscillator 16 clocks two D-type flip-flops 37 and 38. The inverting output of the first flip-flop 37 is connected to the input of the second flip-flop 38 whose non-inverting output is connected back to the input of the first flip-flop, so that the outputs of the two flip-flops form the signals I and Q in phase quadrature at a quarter of the frequency of the clock pulses from the oscillator 16.

Although not illustrated it will be appreciated that a lock-detection and oscillator scan circuit may be provided to force the oscillator frequency to scan initially until phase-lock is achieved and the sum voltage $V_S$ becomes non-negligible.

Figure 4:
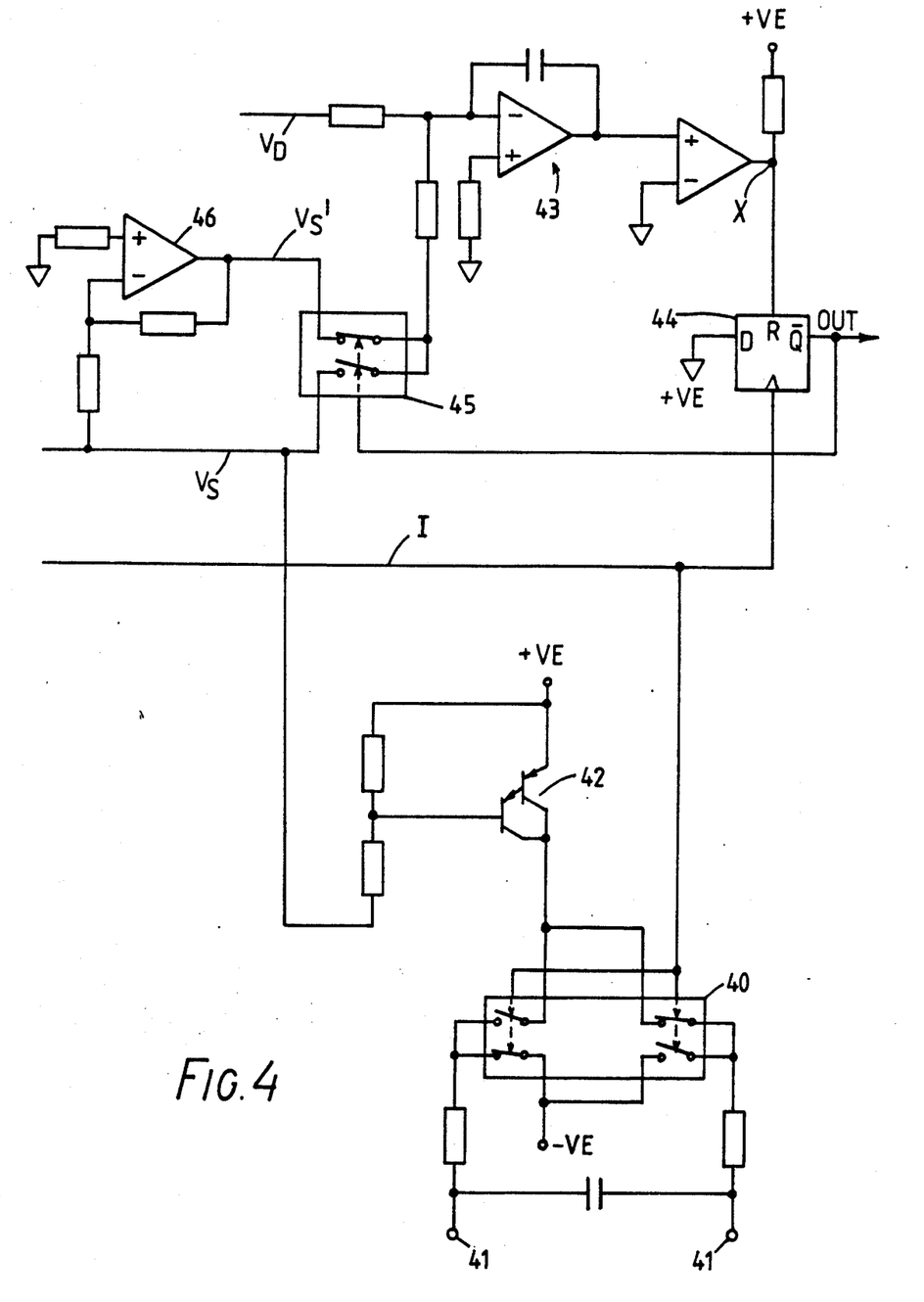
FIG. 4 shows details of output circuits.

FIG. 4 shows the signal I used to drive a dual changeover switch 40 which switches the positive and negative supply voltages alternately to two terminals 41 for connection to the drive coil 12 of FIG. 1. Thus a balanced drive at the frequency determined by the phase locked loop oscillator circuit is provided. The sum voltage $V_S$ controls a transistor 42 to limit the drive amplitude, so preventing the magnitude of $V_S$ approaching the power rail voltage, which would result in distortion of $V_S$.

The output unit 25 of FIG. 1 is formed by a D-type flip-flop 44 which is set by I and reset by the output of an integrator 43. The integrator 43 sums at its input $V_D$ and the product of $V_S$ and the inverted output of the flip-flop 44, this product being formed by another switching multiplier 45 driven by the output of the flip-flop and receiving $V_S$ and $V_{S'} = V_S$ inverted by an inverting amplifier 46. The instant through the period of the flip-flop 44 at which reset occurs adjusts so as to establish the relationship that the mark space ratio is $1+V_D/V_S$.

The output filters 23 and 24 may be constituted by operational amplifiers with capacitive feedback in conjunction with shunt capacitors. More specifically the filters may be three pole Bessel filters. These filters reject noise away from the operating frequency and average the phase readings over a period. They should have as low a cut off frequency as possible consistent with achieving the required response time, e.g., a cut off frequency of about 1 HZ.

Particularly when the balance adjusting means 13 is employed the sum signal S may be replaced by one of the input signals $I_1$ and $I_2$.

The multipliers illustrated in FIG. 3 are very crude. Effectively they multiply samples of D or S by [1, −1] in each cycle. The pair of values [1, −1] is the coarsest possible approximation to a sine wave which is permitted by the Nyquist theorem. A better approximation is of the form [0, 1, 0, −1] for a sine wave, [1, 0, −1, 0] for a cosine wave. The arrangement of FIG. 3 could easily be modified to operate on this basis. The basic VCO clock frequency would need to be 8 times the resonant frequency of the vibrating tube 6. An even better approximation, representing the preferred embodiment, is of the form [0, 1, 1, 0, −1, −1] for a sine wave and [1, 0, −1, −1, 0, 1] for a cosine wave, requiring a basic VCO clock frequency of 12 times the resonant frequency.

Figure 8:
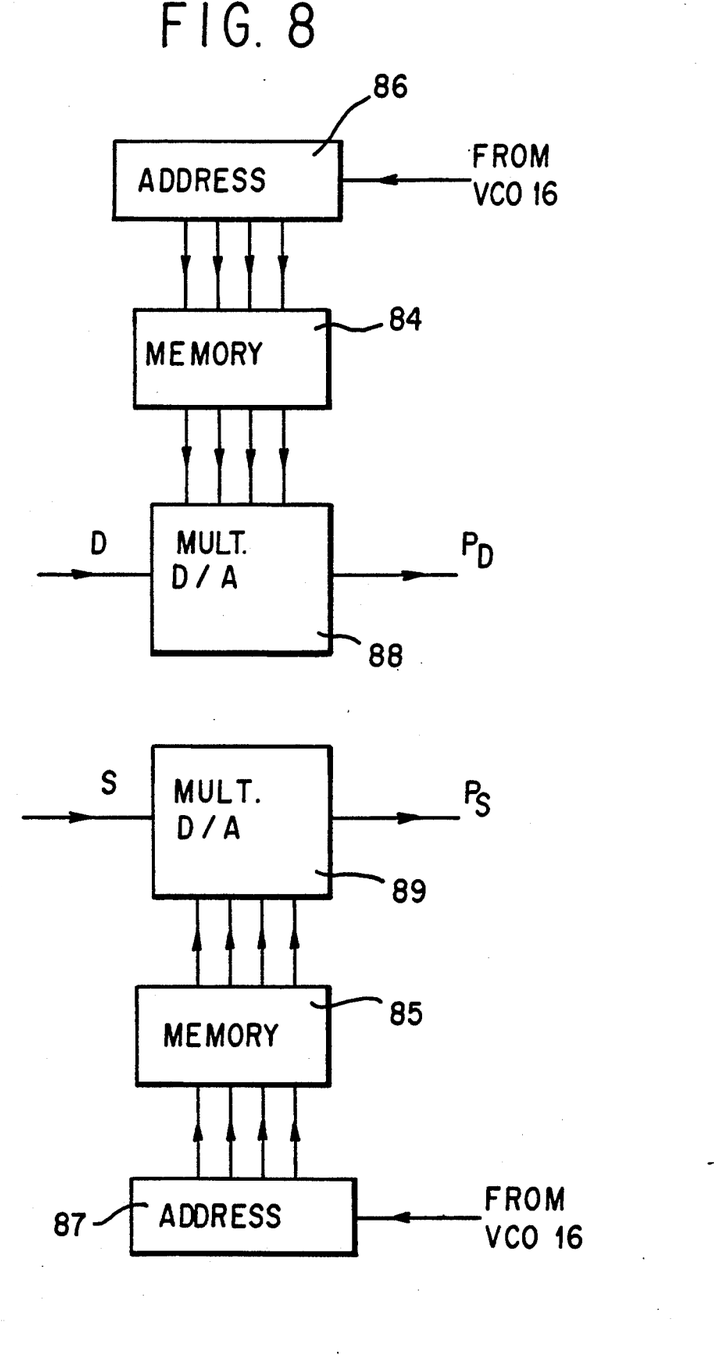
FIGS. 8 and 9 are schematic diagrams of the circuits for carrying out the digital multiplying.

So long as the only multipliers involved are 1, −1 and 0, the technique of FIG. 3 may be employed, i.e., simple switching of positive and negative analog values. However, as an alternative to the use of simple switching waveforms as approximations to sine and cosine waves, and as shown in FIG. 8, the multiplying signals can be digital values read out of memory 84, 85 in cyclic sequence in response to addressing means 86, 87 controlled by the VCO 16. In this case, multiplication is effected by respective multiplying digital to analog converters 88, 89.

Figure 9:
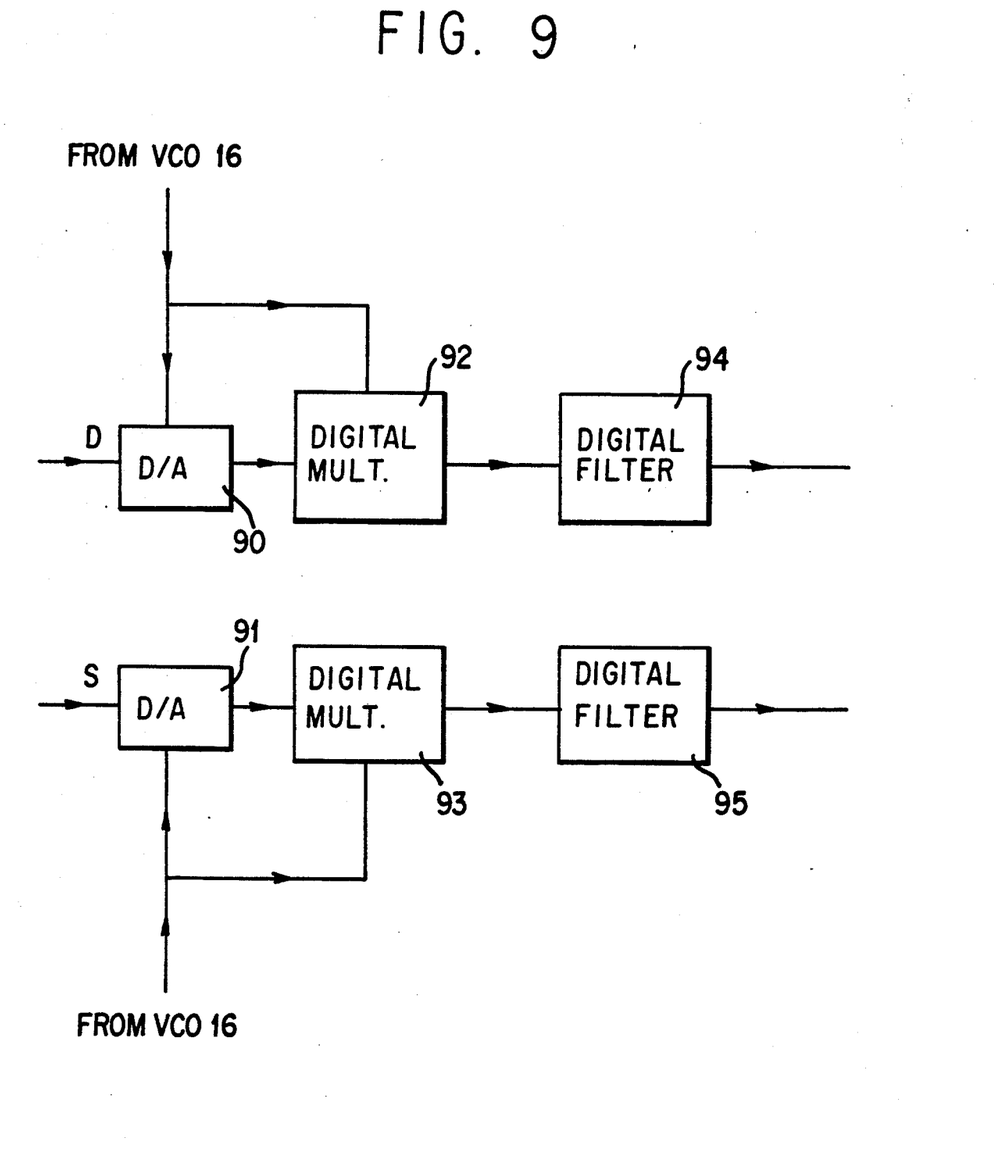

As a further alternative, the multiplications performed at the output of the amplifiers 14 and 15 could be performed wholly digitally. Thus, the VCO could be arranged to run at the appropriate multiple of the frequency of vibration of the mass flow sensing tube and its output be used to trigger respective A/D converters 90, 91, as shown in FIG. 9 which sample the respective outputs of the amplifiers 14, 15. The digital samples thus obtained could then be multiplied by crude digital sine and cosine waves of the forms as explained above, which requires only simple switches followed by simple additions and subtractions to form the required products, or by digital sine and cosine signals, obtained as described in relation to FIG. 8, in digital multipliers 92, 93. The filters, 23, 24, 28 and 29 would then be replaced by digital filters 94, 95.

Figure 5:
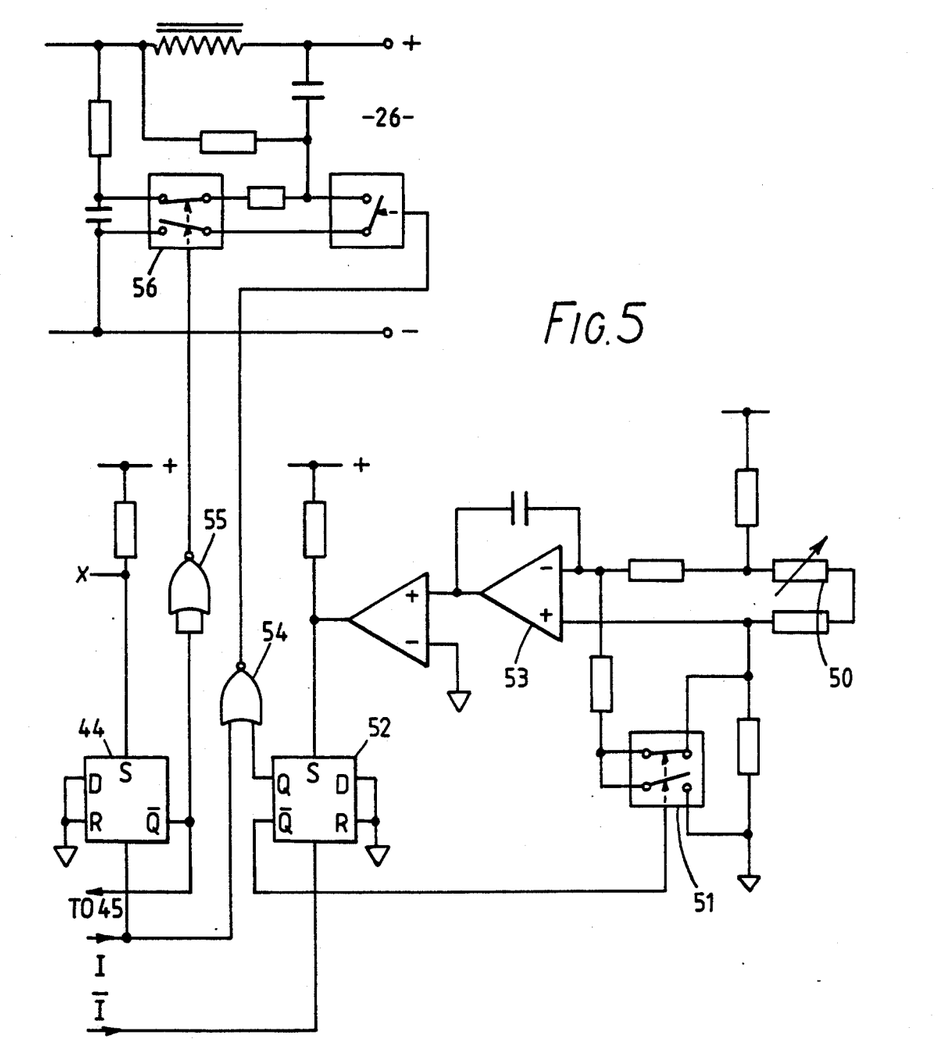
FIG. 5 shows a modified output circuit.

The circuit can be modified to include circuitry which adds to the output signal produced by the modulator 26 an additional mark-space signal representative of the temperature of the vibrating element of the transducer, as sensed by a platinum resistance temperature sensor associated with the vibrating element: this enables the mass flow measurement to be compensated for changes in the Young's modulus of the vibrating element with temperature. The temperature signal producing circuitry involved is shown in FIG. 5 which also shows the modulator 26 of FIG. 1, with the necessary modification for transmitting the temperature signal. The temperature signal producing circuitry is basically similar to the circuit based on the elements 43, 44 and 45 in FIG. 4, and is driven by an inverted version of the signal I of FIGS. 3 and 4 (e.g., derived from the inverted Q output of 38 in FIG. 3).

Thus FIG. 5 shows the platinum resistance thermometer 50 and associated multiplier 51 driven from a flip-flop 52 clocked by I inverted (taken from flip-flop 38 in FIG. 3). The product signal is smoothed in low pass filter 53 and applied to the S input of flip-flop 52 whose Q output is applied, with I, to a NAND gate 54 providing a control input to the modulator 26. Point X (FIG. 4) is now connected to the S input of flip-flop 44 whose inverted Q output is inverted in inverter 55 and used to control a multiplier switch 56 in modulator 26.

Figure 6:
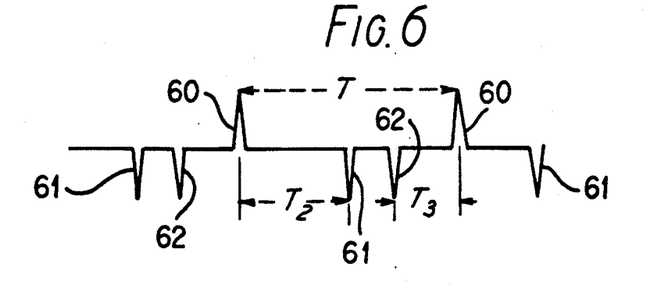
FIG. 6 is an explanatory waveform relating to FIG. 5.

FIG. 6 shows the pulse pattern transmitted by this circuit. Positive pulses 60 establish the transducer period. First negative pulses 61 occur an interval $T_2$ after the positive pulses and represent the phase information in accordance with the relationship:

$$\text{phase} = 7(0.47 - T_2/T)$$

Second negative pulses 62 occur an interval $T_3$ before the positive pulses and represent the resistance of the thermometer in accordance with:

$$\text{resistance} = 270 \, (T_3/T) + 80R.$$

Figure 7:
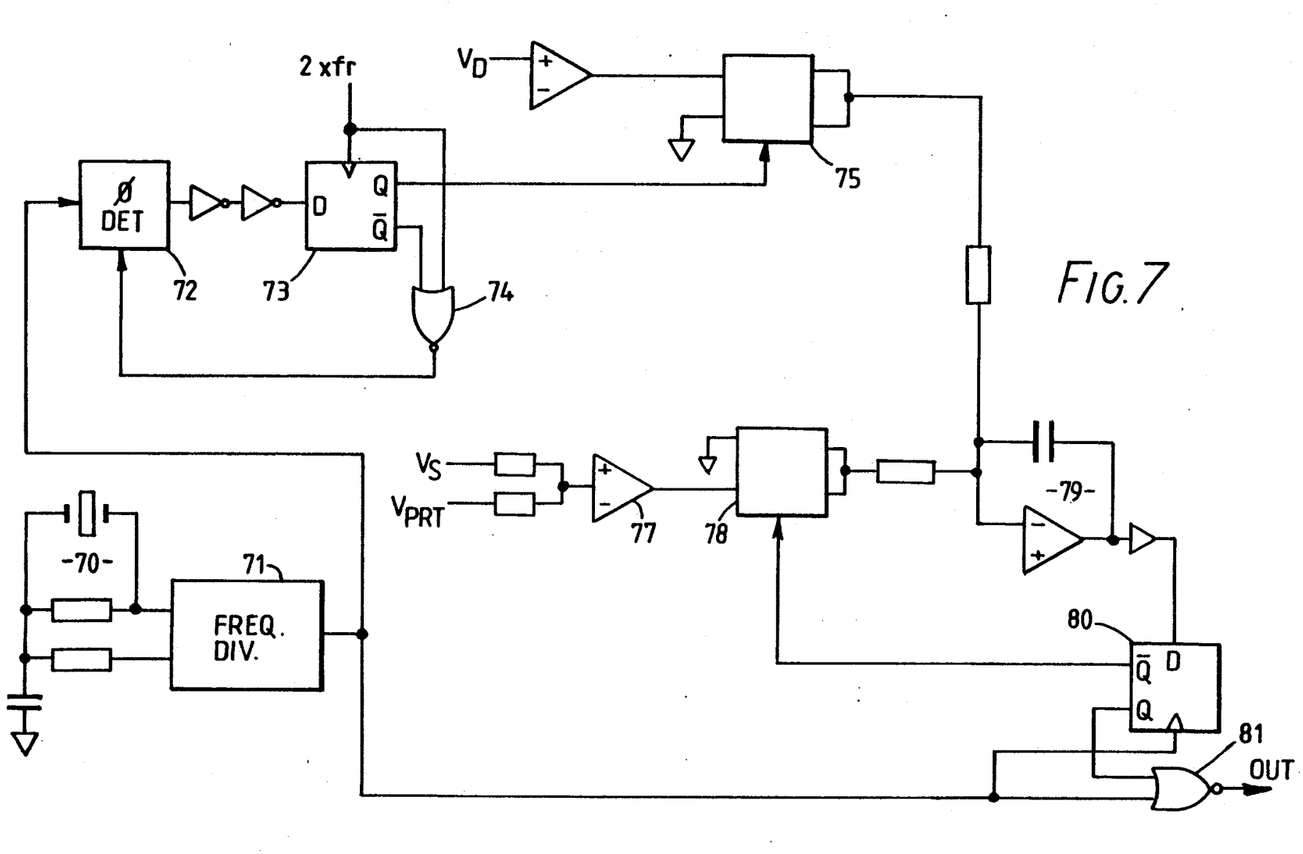
FIG. 7 shows a different output circuit.

FIG. 7 shows an alternative output circuit in which a crystal oscillator 70 and frequency divider circuit 71 provide a signal $f_c$ at 1200 Hz to an edge triggered phase detector 72 whose output is applied to the D input of a flip-flop 73 clocked at twice the resonance frequency $f_r$. A NAND gate 74 provides a feedback signal while the Q output of the flip, flop provides a signal representing $f_c/f_r$. This multiplies $V_D$ in a switching multiplier 75.

$V_S$ is added to the platinum resistance thermometer measurement PRT in an amplifier 77 whose output is applied to another multiplier 78. The outputs of the two multipliers are added and smoothed in an integrator 79 whose output is applied to the D input of a flip-flop 80 clocked at $f_c$ and providing the multiplying waveform back to the multiplier 78.

The output pulse rate provided by a NAND gate 81 is one pulse per kg of fluid, being given by:

$$(V_d V_s)(f_c/f_r)(R_1 + R_{PRT}) (R_2 + R_{PRT})$$

This equation includes temperature compensation for Young's modulus and gives a very accurate output for a low circuit cost with few components.

The loop based on the edge-triggered phase detector 72 produces a square wave signal whose frequency is proportional to the reference frequency $f_c$ divided by the vibration frequency of the tube $f_r$. This square wave signal switches the voltage $V_D$ into the integrator 79, which receives in opposition a switched voltage derived from $V_S$ (but corrected by $V_{PRT}$ in dependence upon the temperature of the tube), under the control of a control loop, each time the output of the integrator exceeds a given threshold (zero). The integrator 79 and its control loop thus effectively operate as a V to F converter, to produce an output signal whose frequency is proportional to mass flow, more specifically comprises 1 pulse per kilogram of fluid flow.

I claim:

1. A combined output and drive circuit for providing a drive signal for a drive transducer of a mass flow transducer in response to two input signals fed to the circuit from spaced pick-up transducers of the mass flow transducer, comprising means for forming a first signal from at least one of the two input signals and a difference signal from the input signals, a phase locked loop oscillator circuit controlled by the first signal and providing the drive signal and first and second multiplying signals in phase quadrature with each other, means for multiplying the first and difference signals by the first and second multiplying signals respectively to form two product signals, and low pass filter means for filtering the two product signals to provide two measurement voltages related to phase difference and hence to mass flow rate.

2. A circuit according to claim 1, wherein the first signal is formed from the sum of the two input signals.

3. A circuit according to claim 1, wherein the first signal is a selected one of the two input signals.

4. A circuit according to claim 1, comprising an output unit responsive to the two measurement voltages to provide an output square wave whose mark-space ratio is varied from a datum value in dependence upon one measurement voltage divided by the other measurement voltage.

5. A circuit according to claim 1, comprising an output unit responsive to the phase-locked loop oscillator circuit to provide an output waveform with a period representing the period of the mass flow transducer and with a marker marking off a first interval of the said period as representative of the said phase difference.

6. A circuit according to claim 5, wherein the output unit further provides a second marker in the output waveform marking off a second interval of the said period as representative of a temperature measurement at the mass flow transducer.

7. A circuit according to claim 1, comprising an output unit providing output pulses at a rate proportional to the ratio of the first measurement voltage to the second measurement voltage multiplied by the ratio of a reference frequency to the frequency of the drive signal.

8. A circuit according to claim 7, wherein the output unit further multiplies the output pulse rate by a correcting term of the form $(R1+R)/(R2+R)$, where R is a resistance value representative of a temperature measurement at the mass flow transducer and R1 and R2 are two fixed values.

9. A circuit according to claim 1, wherein the multiplying signals are switching waveforms and each multiplying means is a switching type multiplier switching non-inverted and inverted versions of the signal fed to the multiplying means to be multiplied by the appertaining switching waveform.

10. A circuit according to claim 9, wherein each switching waveform is such as to represent a sine wave in the form [0, 1, 1, 0, −1, −1].

11. A circuit according to claim 1, wherein the multiplying signals are analog signals and each multiplying means is an analog multiplier.

12. A circuit according to claim 1, wherein the multiplying signals are digital values read out of memory means in cyclic sequence in response to addressing means controlled by the oscillator circuit and each multiplying means is a multiplying digital to analog converter.

13. A circuit according to claim 1, wherein the multiplying means comprise analog to digital converters operative on the first and difference signals to provide corresponding digital signals at a sampling frequency higher than the frequency of the mass flow transducer and means for multiplying these digital signals by digital sine and cosine signals to form the two product signals.

14. A circuit according to claim 13, wherein the sampling frequency is 4 or 6 times the mass flow transducer frequency and each sine signal is of the form [0, 1, 0, −1] or [0, 1, 1, 0−1, −1].

15. A circuit according to claim 1, comprising balance adjusting means responsive to a balance control signal derived from the product of the difference signal and the first multiplying signal to adjust the balance of the two input signals.

16. A circuit according to claim 15, wherein the balance adjusting means comprise two potentiometric chains, one for each input signal and each comprising first and second FETs in series with the respective balance input signal picked off from a point between the two FETs, and wherein the balance control signal controls the first FET of one potentiometer chain and the second FETs of the other potentiometric chain and the balance control signal inverted controls the second FET of the said one potentiometric chain and the first FET of the said other potentiometer chain and the balance control signal inverted.

* * * * *